May 24, 1932. C. R. GOTTSCHALL ET AL 1,859,586
CONVEYER FOR COMBINES OR LIKE MACHINES
Filed Oct. 3, 1927  2 Sheets-Sheet 1
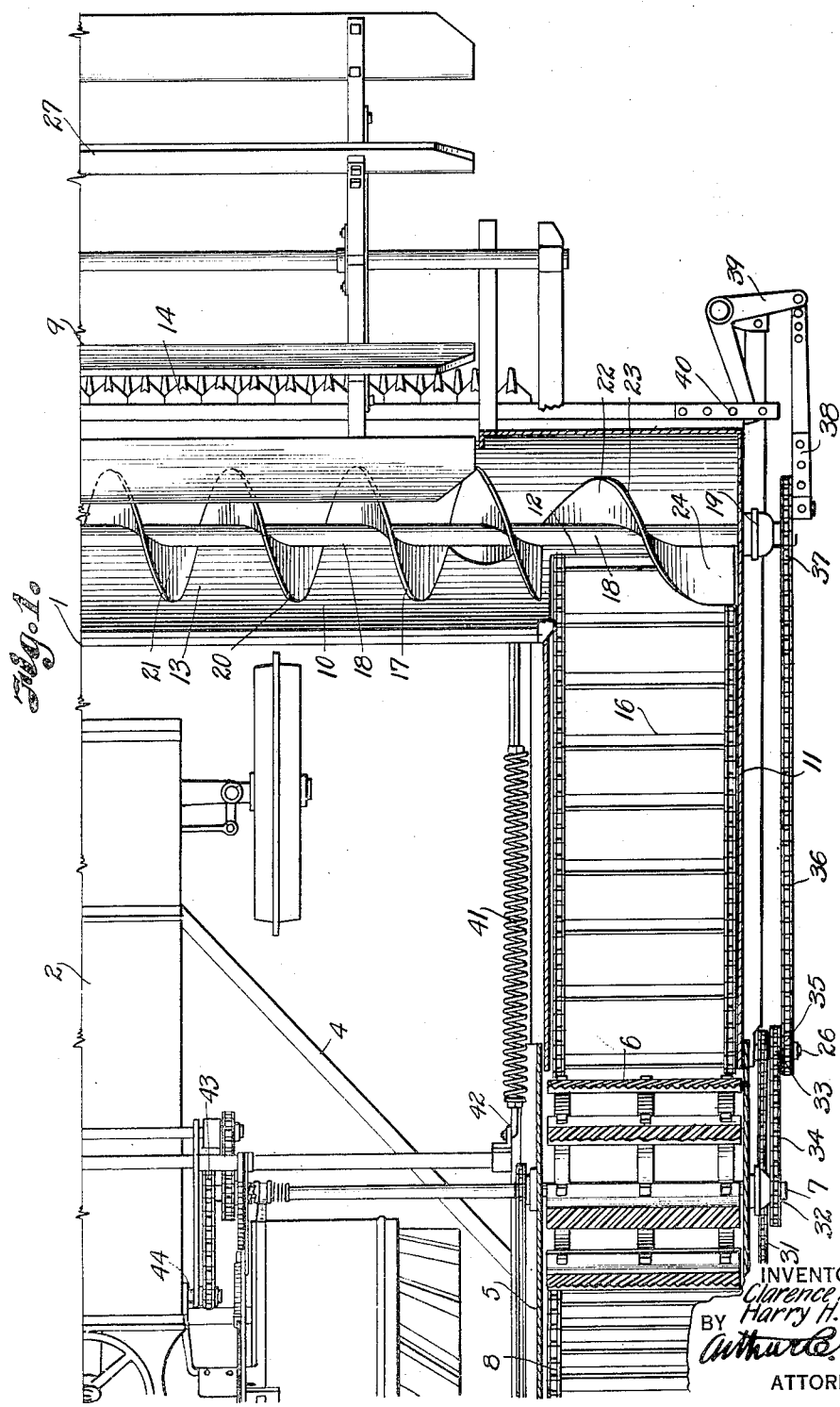
INVENTORS
Clarence R. Gottschall
Harry H. Pike.
BY
Arthur C. Brown
ATTORNEY May 24, 1932.  C. R. GOTTSCHALL ET AL  1,859,586
CONVEYER FOR COMBINES OR LIKE MACHINES
Filed Oct. 3, 1927   2 Sheets-Sheet 2
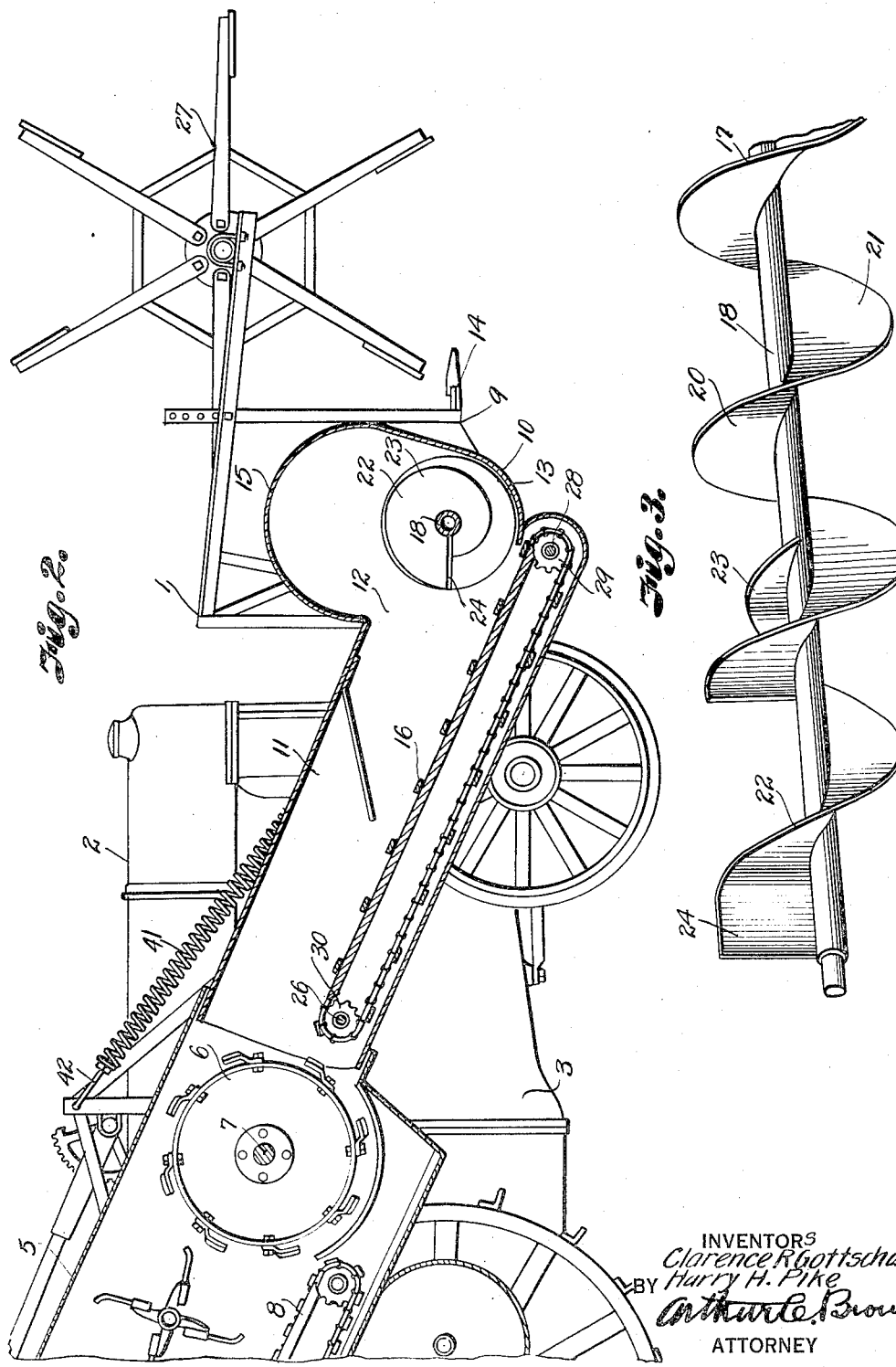

Patented May 24, 1932

1,859,586

UNITED STATES PATENT OFFICE

CLARENCE R. GOTTSCHALL AND HARRY H. PIKE, OF INDEPENDENCE, MISSOURI, ASSIGNORS TO THE GLEANER COMBINE HARVESTER CORPORATION, OF KANSAS CITY, MISSOURI, A CORPORATION OF DELAWARE

CONVEYER FOR COMBINES OR LIKE MACHINES

Application filed October 3, 1927. Serial No. 223,633.

Our invention relates to harvesting mechanisms and more particularly to that type of harvesting machinery comprising the combination of threshing and harvesting mechanism, and commonly known as combines. More specifically the invention relates to feeding conveyers for delivering grain-carrying straw from the sickle to the thresher cylinder of a combine, the principal object of the invention being to present the straw to the cylinder uniformly and in a continuous flow without fanning. A further object is to provide smooth feeding means having no projections or corners to catch the straw and cause winging.

In accomplishing these and other objects of the invention we have provided improved details of structure, the preferred forms of which are illustrated in the accompanying drawings, wherein:

Fig. 1 is a plan view of a portion of a combine having a feeding conveyer embodying our invention.

Fig. 2 is a longitudinal vertical section through a threshing cylinder and the feeding portion of the conveyer.

Fig. 3 is an enlarged detail perspective view of the delivery end of the feeding conveyer, illustrating particularly the construction of the feeder portion.

Referring in detail to the drawings:

The invention pertains particularly to means for delivering cut grain to the threshing elements of a combine and the parts only to which the invention is especially related will be described in detail.

1 designates a combine here illustrated as a type transported and operated by a tractor 2 having an engine 3, the combine including a frame 4 supported by the tractor, a longitudinal separator housing 5 containing the threshing mechanism including a threshing cylinder 6 supported by a counter shaft 7, a thresher raddle 8 receiving grain and straw from the threshing cylinder, and other separator elements not shown. The harvester element 9 of the combine comprises a conveyer housing 10 extending transversely of the combine frame and a longitudinal delivery housing 11 communicating therewith through an opening 12 in the conveyer housing 10. The delivery housing extends in the plane of said separator housing 5, is connected and in communication therewith, and together with the conveyer housing is tiltable in relation thereto.

The transverse housing 10 comprises an open grain head receiving trough-shaped portion 13 along the front edge of which is carried a sickle bar 14, the delivery end of the trough being enclosed by a cover 15 constituting a straw-feeding or delivery portion from which the grain heads are fed to a thresher-feeding raddle 16 contained in the housing 11, as presently described.

A screw conveyer 17 having a shaft 18 extends from end to end of the transverse conveyer housing 10, the shaft extending through the ends of the housing and being rotatably supported thereby in suitable bearings, such as 19. The conveyer comprises a regular spiral portion 20 consisting of a plurality of continuous flights or integral helical sections 21, of equal pitch and diameter, and disposed on the shaft along the portion thereof positioned in the trough portion 13 adjacent the sickle bar, and a conical feeder section 22 at its delivery end arranged on the shaft 18 and fixed thereto, the major portion of section 22 being positioned in the feeder portion 14 of the housing member 10. Said section 22 comprises a spiral portion 23 disposed longitudinally of the shaft, the start of which begins between the end flights of the spiral portion 20 and at a diameter less than the main spiral and gradually tapering to substantially the diameter of the main spiral and terminating in a flat plane or wing portion 24 disposed longitudinally and radially of the shaft adjacent its end.

The spiral screw, therefore, may move grain carrying straw which is retained by the housing 10 transversely of the frame and deliver it to the feeder section of the conveyer for feeding to the thresher feeding raddle 16, presently described.

A pivoting shaft 26 is rotatably supported by the overlapping ends of the separator housing 5 and delivery housing 11; and the harvester element 9 is thus pivotal on the shaft to a desired elevation for the cutter element comprising the sickle bar 14 and a reel 27, for adjustment to the relation of the heads of standing grain to the ground, the heads being removed by the cutters and projected by the reel into the trough portion of the housing where they are picked up and moved along the housing by the spiral screw flights.

An idling shaft 28 transversely supported by the side walls of the housing 11 supports the outer or forward end of the thresher feeding raddle 25, the rear end being supported by said pivoting shaft 26; sprockets 29 and 30 respectively on the shaft 26 and the shaft 28 engaging the raddle for moving the same under actuation of the shaft 26 by a chain 31 from the separator. A sprocket 32 is keyed on the outer end of the counter shaft and a sprocket 33 is loosely mounted on the pivotal shaft 26, a chain 34 running over the two sprockets 32 and 33. A sprocket 35 is keyed to said sprocket 33 for transmitting motion from the counter shaft through a chain 36 to a sprocket 37 on the protruding end of the conveyer shaft 18.

Eccentrically mounted on said sprocket 37 is a pitman 38 which, upon reciprocable actuation by the sprocket, rocks a bell crank 39 connected with a sickle bar extension rod 40 to operate the cutter.

Coil springs 41 support in substantial balance the pivoting housing and the operating elements carried thereby, ends, as 42, being fixed in the frame.

The counter shaft through which the thresher cylinder, the conveyer, and the sickle bars are actuated, is rotated through a chain 43 from a power take-off shaft 44 of the tractor, suitable clutch means being provided for selective engagement of the tractor engine with the operating parts.

The present invention relates particularly to the transverse conveyer and feeding elements and to the thresher-feeding raddle. Assuming a combine assembled as indicated having means for actuating the several parts and adapted for transverse movement of grain heads to a threshing element offset from the cutter, the operative steps in which our invention is involved are as follows:

The grain heads received by the housing are propelled by the rotating screw transversely of the combine towards the threshing elements. The grain heads, which might tend to be crowded and compressed adjacent the delivery end of the conveyer screw, are kept in loose condition, and their propulsion is accelerated, by the tapering secondary spiral which segregates a portion of an advancing mass and moves it forward ahead of the major portion of said mass, intruding its separating edge gradually into the mass to promote suitable arrangement of the heads. Therefore, as the grain heads are moved from the portion of the housing adjacent the sickle into the feeder portion of the housing, and are engaged by the tapering spiral flight, the stems are straightened; and continuous flow is effected across the width of the thresher-feeding raddle. As the straw moves across the feeding portion of the housing, it is deposited on the flat end of the second feeding or delivery section of the screw conveyer, and is, therefore, delivered to the extreme edge of the thresher-feeding raddle and uniform distribution of the grain heads to the raddle is accomplished.

The grain heads slide from the feeding portion of the screw to the raddle so that no appreciable fanning effect is produced by the movement of parts in delivery, and the smooth contour of the feeding section of the screw permits each grain head to move without obstruction, as pushed by the following mass and by the rotating spiral, into the feeding housing, and from the blade of the feeding section of the screw to the raddle.

The raddle conducts the grain heads to the threshing cylinder and from that point on the actuation is similar to ordinary practice in a combine of this nature.

What we claim and desire to secure by Letters Patent is:

1. In harvester mechanism, a screw conveyer including a shaft, primary flighting on said shaft, and secondary flighting of graduated diameter on said shaft between the primary flighting at the delivery end of the conveyer.

2. In harvester mechanism, a conveyer comprising a screw portion having flighting of uniform pitch and diameter and a feeding portion at the delivery end of the conveyer including a screw flight having substantially uniform pitch and differential diameter and having a wing extending in the plane of the longitudinal axis of the conveyer.

3. In harvester mechanism, a transverse screw conveyer, and a feeding element having a tapering screw positioned intermediately of wings of the conveyer screw adjacent the delivery end of the conveyer and having a flattened end extending in the plane of the longitudinal axis of the conveyer.

4. In harvester mechanism, a conveyer housing, a shaft rotatable in the conveyer housing, a conveyer screw fixed to the shaft, and a supplemental tapered screw interlapped with the conveyer screw and terminating in a delivery wing.

5. In harvester mechanism, a screw conveyer, a secondary screw having outwardly tapering flighting positioned intermediately of the terminal flighting of the conveyer screw and having a wing for delivering cut grain transversely of the conveyer.

6. In harvester mechanism, a conveyer including a transverse housing having a feeding end, a screw rotatable in the transverse housing, and a supplemental screw of differential diameter and having its major portion positioned in the feeder end of the conveyer housing for increasing feed of the conveyer at its delivery end, one of said screws being flattened at its delivery end.

7. In harvester mechanism, a housing, a screw conveyer in the housing, and a supplemental screw having a tapered portion interposed between convolutions of the conveyer screw, one of said screws having a flattened delivery end.

8. In a harvester mechanism including a sickle and a threshing cylinder, a screw conveyor having flighting of uniform pitch and diameter for propelling grain heads cut by the sickle longitudinally thereof, and means at the delivery end of the conveyer including a section of axially aligned flighting of substantially the same pitch as the first named flighting for accelerating and segregating the grain heads discharged from the first named flighting and having a flattened portion extending in the plane of the longitudinal axis of the conveyer, to move the segregated mass into the cylinder ahead of the major portion of the mass propelled by the first named flighting.

In testimony whereof we affix our signatures.

HARRY H. PIKE.
CLARENCE R. GOTTSCHALL.